Oct. 15, 1940.    O. ZIMMERMANN    2,217,930
PHOTOGRAPHIC VIEW FINDER
Filed Oct. 14, 1938
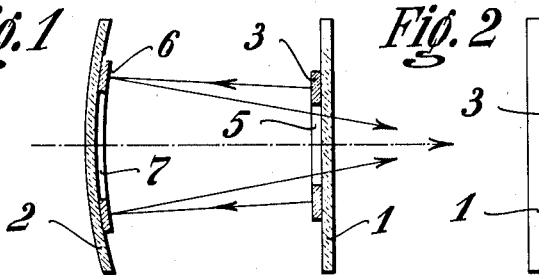
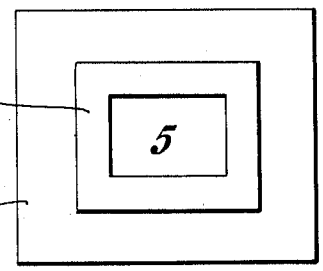
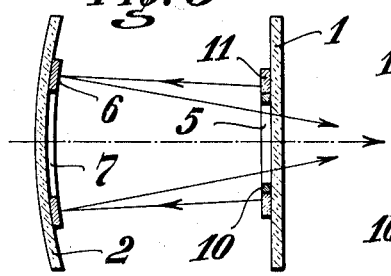
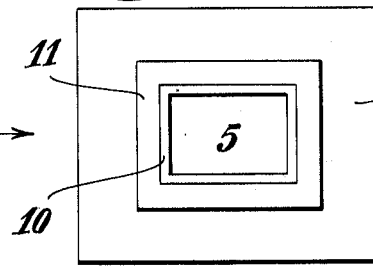
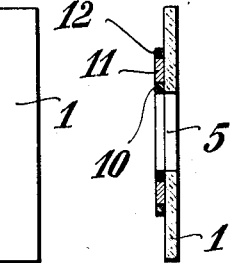
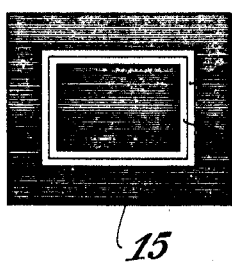
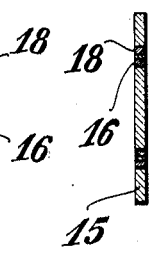
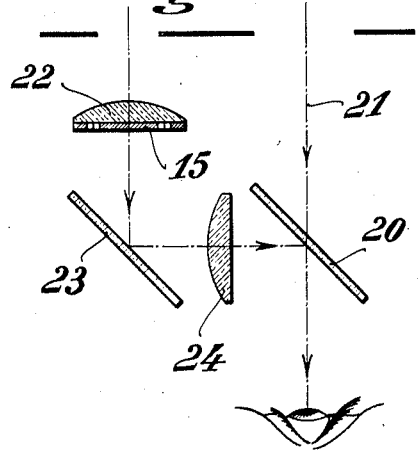
INVENTOR
*Otto Zimmermann*
BY
*Ivan E. A. Konigsberg*
ATTORNEY Patented Oct. 15, 1940

2,217,930

UNITED STATES PATENT OFFICE 2,217,930

PHOTOGRAPHIC VIEW FINDER

Otto Zimmermann, Wetzlar, Germany, assignor to Ernst Leitz, G. m. b. H., Wetzlar, Germany Application October 14, 1938, Serial No. 234,866
In Germany November 19, 1937

1 Claim. (Cl. 88—1.5)

This invention relates to improvements in photographic view finders of the type in which a rectangular mark is imaged by reflection to define and frame the field of view according to the principle of a collimator.

Photographic view finders of this type usually consist of two spaced members or supports. One member is mounted in front of the eye opening of the finder and carries the mark which is to be imaged by reflection. The other member is spaced in front of the first member and carries a mirrored frame which surrounds the field of view and reflects the image of the first mark into the eyes of the observer.

Photographic view finders of the type described are known to the art. For instance it has been proposed to construct such a finder with a rectangular mark made by painting the same in a bright, preferably white color upon the ocular member which is in front of the eye opening. The light which enters from the sides between the spaced members is usually sufficient to illuminate the mark so that it may be imaged by reflection from the object member which surrounds and defines the field of view opening.

However, in cases where the light is insufficient or excluded wholly or partly as by an enclosing housing for instance, the painted mark will not be sufficiently illuminated so that the image thereof may be distinguished against a bright background. This disadvantage may be eliminated by making the rectangular mark a mirrored surface according to this invention.

The mirror mark may be combined with marks of light diffusing properties so that the image of such reflected mark appears to advantage and distinct against both a bright as well as against a dark background.

The object of this invention is therefore to provide a photographic view finder consisting of a first member in front of the eye opening and provided with a rectangular mark consisting of a mirrored surface either alone or in combination with one or more light diffusing members or marks. In front of the ocular member there is supported another member which carries the mirror frame reflecting the image of the mark. The invention includes also the use of a rectangular mark of clear glass forming border lines for defining the field of view.

With the foregoing and other ancillary objects the invention is embodied in a photographic view finder arranged and constructed as hereinafter described and as illustrated in the accompanying drawing in which—

Fig. 1 illustrates a view finder in which the rectangular mark is in the form of a mirror.

Fig. 2 is a face view of the eye opening member of the finder in Fig. 1.

Figs. 3 and 4 are similar views illustrating a view finder in which the mirror mark is surrounded by a light diffusing mark.

Fig. 5 shows a modification in which two mirror marks enclose a light diffusing mark.

Fig. 6 is a face view of a frame member provided with a rectangular mark forming border lines for defining the field of view.

Fig. 7 is a sectional view of the mark shown in Fig. 6.

Fig. 8 illustrates diagrammatically a view finder system including a mark member according to Figs. 6 and 7.

Referring to Figs. 1 and 2 the view finder comprises two members 1 and 2 spaced a distance apart. The member 1 is a transparent glass body provided with a rectangular mirrored mark 3. The space within the mark 3 forms the eye opening 5 of the finder as will be understood. The other member 2 is a concave transparent glass body provided with a concave mirrored rectangular frame 6 which surrounds and frames the field of view opening 7. The centers of the two rectangular frames 3 and 6 coincide with the optical axis of the finder and the proportions are such that only the frame 3 is reflected in the mirror 6. The frame 3 is located in the focal plane of the mirror. The field of view opening 7 which is not required for reflecting purposes may be wholly transparent, grey or partly silvered. That portion of the member 2 which surrounds the mirrored frame 6 may be nontransparent.

The mirror frame 3 may be dull or brightly polished. It may be plane or rough surfaced. These modifications are not illustrated. The member 1 may be curved or in the form of a lens.

When this finder is directed against a bright background the mirror frame 3 receives the incoming light rays and the image of the mark is reflected so brilliantly that it is easily distinguished from the bright background so that the observer has no difficulty in clearly observing the field of view. When this finder however, is directed against a dark background, then the mirror mark 3 reflects only the dark surface of such background and consequently the reflected image can only be seen with the greatest difficulty because of the absence of illuminating rays.

Figs. 3, 4 and 5 illustrate a view finder which may be used with equal advantage against either a dark or a bright background. In these figures the members 1 and 2 are arranged as described above. The member 1 carries a rectangular mark which consists of an inner rectangular mirrored mark or frame 10 surrounded by an outer rectangular mark 11 of light diffusing substance. For instance it may be made by painting with a bright or white color. Fig. 5 shows a modification in which the diffusing portion 11 is surrounded by a mirrored frame 12. A further modification, not shown, may be arranged by placing a mirrored mark such as 10 between two diffuse portions such as 11.

When this finder is used against a bright background, the diffuse portion 11 by itself cannot be distinguished with certainty to define the field of view. But inasmuch as the mirrored portion 10 is brightened and illuminated by the rays incoming from the background a good and sufficient rectangular frame mark appears distinct against the background. On the other hand, when this finder is directed against a dark background then the reflection from the latter in the mirror portion 10 is not sufficient for the image of the portion 10 to form a distinguishing frame. In this case however the brightly colored diffusing portion 11 receives sufficient illumination so that it forms a distinguishing mark with sufficient certainty.

Figs. 6 and 7 illustrate a frame forming member 15 which is nontransparent and provided with a rectangular mark 16 which is clear and wholly transparent. This mark is surrounded by a dull semitransparent rectangular light diffusing mark 18. The two frames 16 and 18 may be spaced a small distance apart or may be adjacent.

The frame plate 15 may be used to advantage in a finder system such as is illustrated in Fig. 8. In this figure the numeral 20 designates a partly silvered angularly disposed semitransparent reflecting mirror mounted in the optical axis 21 of the finder. To one side of the optical axis the said frame plate 15 is suitably supported to receive incoming light rays. A lens 22 serves to distribute the light equally on the plate 15. Behind the latter there is mounted a reflector 23 and between the latter and the mirror 20 there is lens 24 for forming the images of the frames 16 and 18 in the plate 15 as will be understood.

When the finder in Fig. 8 is used the observer will see in the mirror 20 the field of view surrounded by border lines formed by the reflected images of the frames 16 and 18. If the background is dark then the diffuse frame 18 is clearly to be seen. If the background is bright, the border lines formed by the clear frame 16 are clearly seen and define the field of view.

It will therefore be noticed that the finders illustrated in Figs. 1 to 5 have as a common feature a rectangular mirrored frame which may be used either alone as in Figs. 1 and 2 or in combination with rectangular light diffusing frames as in Figs. 3, 4 and 5. The finder in Figs. 6, 7 and 8 is of the same type in that it has the feature in common with the other finders that a rectangular frame or frames is reflected in infinity according to the collimator principle and that the reflected images may be a diffuse or a clear transparent frame member in several combinations suitable for framing the field of view as may be desired or necessary.

I claim:

A photographic view finder in which the images of rectangular framing elements are reflected to frame the field of view in the optical axis of the view finder comprising a nontransparent plate having formed therein a transparent rectangular frame portion surrounded by a light diffusing rectangular frame and an optical system for forming images of the said two rectangular frames and reflecting said images collimatorlike at a great distance into the field of view of said view finder, said transparent frame portion transmitting light without diminution to form an image defining border against a bright background, said diffusing frame forming an image defining border against a dark background.

OTTO ZIMMERMANN.